United States Patent
Andarawis et al.

(10) Patent No.: US 6,909,942 B2
(45) Date of Patent: Jun. 21, 2005

(54) METHOD FOR POWER DISTRIBUTION SYSTEM COMPONENTS IDENTIFICATION, CHARACTERIZATION AND RATING

(75) Inventors: Emad Andarawis Andarawis, Ballston Lake, NY (US); Marc Robert Pearlman, Clifton Park, NY (US); Ertugrul Berkcan, Clifton Park, NY (US); Kenneth Brakeley Welles, Scotia, NY (US); Charles Scott Sealing, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 22 days.

(21) Appl. No.: 10/373,642

(22) Filed: Feb. 25, 2003

(65) Prior Publication Data

US 2003/0229423 A1 Dec. 11, 2003

Related U.S. Application Data

(60) Provisional application No. 60/438,159, filed on Jan. 6, 2003, and provisional application No. 60/359,544, filed on Feb. 25, 2002.

(51) Int. Cl.⁷ .............................. H02J 3/00; H02B 1/20
(52) U.S. Cl. ..................... 700/286; 700/287; 700/290; 361/679
(58) Field of Search .............................. 700/286, 290; 361/670–679

(56) References Cited

U.S. PATENT DOCUMENTS

| | | |
|---|---|---|
| 3,772,505 A | 11/1973 | Massell |
| 3,938,007 A | 2/1976 | Boniger et al. |
| 3,956,671 A | 5/1976 | Nimmersjo |
| 3,963,964 A | 6/1976 | Mustaphi |
| 4,001,742 A | 1/1977 | Jencks et al. |
| 4,245,318 A | 1/1981 | Eckart et al. |

(Continued)

FOREIGN PATENT DOCUMENTS

| | | | |
|---|---|---|---|
| EP | 0718948 A2 | 6/1996 | ......... H02H/3/093 |
| EP | 0723325 A1 | 7/1996 | ............ H02H/7/26 |
| EP | 0949734 A2 | 10/1999 | ......... H02H/3/093 |

OTHER PUBLICATIONS

International Search Report from corresponding PCT/US03/05449; 4 pgs.

Atanackovic D. et al. An Integrated Knowledge–Based Model For Power–System Planning IEEE Expert, IEEE Inc. New York, Jul. 1997; pp. 65–71.

*Primary Examiner*—Leo Picard
*Assistant Examiner*—Michael D. Masinick
(74) *Attorney, Agent, or Firm*—Ohlandt, Greeley, Ruggiero & Perle

(57) ABSTRACT

A method for operating a power distribution system is provided. The power distribution system includes a plurality of components, and at least one node electronics unit coupled to at least one control processing unit. The method includes associating a unique identifier with at least one component class of the power distribution system, identifying each component based on the identifier, determining a specification associated with each identifier, and operating at least one of the node electronics unit and the control processing unit based on the determined specification.

33 Claims, 9 Drawing Sheets

U.S. PATENT DOCUMENTS

| | | |
|---|---|---|
| 4,291,299 A | 9/1981 | Hinz et al. |
| 4,301,433 A | 11/1981 | Castonguay et al. |
| 4,311,919 A | 1/1982 | Nail |
| 4,415,968 A | 11/1983 | Maeda et al. |
| 4,423,459 A | 12/1983 | Stich et al. |
| 4,432,031 A | 2/1984 | Premerlani |
| 4,455,612 A | 6/1984 | Girgis et al. |
| 4,468,714 A | 8/1984 | Russell |
| 4,589,074 A | 5/1986 | Thomas et al. |
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A * | 6/1995 | Good et al. .................... 361/92 |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. .............. 395/750 |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto ...................... 364/492 |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A * | 6/1998 | Murphy et al. .............. 700/286 |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. ............... 361/72 |
| 5,982,595 A | 11/1999 | Pozzuoli |
| 5,982,596 A | 11/1999 | Spencer et al. |
| 5,995,911 A | 11/1999 | Hart |
| 6,005,757 A | 12/1999 | Shvach et al. |
| 6,005,758 A | 12/1999 | Spencer et al. |
| 6,018,451 A | 1/2000 | Lyke et al. |
| 6,038,516 A | 3/2000 | Alexander et al. |
| 6,047,321 A | 4/2000 | Raab et al. |

| | | |
|---|---|---|
| 6,054,661 A | 4/2000 | Castonguay et al. |
| 6,055,145 A | 4/2000 | Lagree et al. |
| 6,061,609 A | 5/2000 | Kanoi et al. |
| 6,084,758 A | 7/2000 | Clarey et al. |
| 6,138,241 A | 10/2000 | Eckel et al. |
| 6,139,327 A | 10/2000 | Callahan et al. |
| 6,141,196 A | 10/2000 | Premerlani et al. |
| 6,157,527 A | 12/2000 | Spencer et al. |
| 6,167,329 A | 12/2000 | Engel et al. |
| 6,175,780 B1 | 1/2001 | Engel |
| 6,185,482 B1 | 2/2001 | Egolf et al. |
| 6,185,508 B1 | 2/2001 | Van Doorn et al. |
| 6,186,842 B1 | 2/2001 | Hirschbold et al. |
| 6,195,243 B1 | 2/2001 | Spencer et al. |
| 6,198,402 B1 | 3/2001 | Hasegawa et al. |
| 6,212,049 B1 | 4/2001 | Spencer et al. |
| 6,233,128 B1 | 5/2001 | Spencer et al. |
| 6,236,949 B1 | 5/2001 | Hart |
| 6,242,703 B1 | 6/2001 | Castonguay et al. |
| 6,268,991 B1 | 7/2001 | Criniti et al. |
| 6,285,917 B1 | 9/2001 | Sekiguchi et al. |
| 6,288,882 B1 | 9/2001 | Criniti et al. |
| 6,289,267 B1 | 9/2001 | Alexander et al. |
| 6,291,911 B1 | 9/2001 | Dunk et al. |
| 6,292,340 B1 | 9/2001 | O'Regan et al. |
| 6,292,717 B1 | 9/2001 | Alexander et al. |
| 6,292,901 B1 | 9/2001 | Lys et al. |
| 6,297,939 B1 | 10/2001 | Bilac et al. |
| 6,313,975 B1 | 11/2001 | Dunne et al. |
| 6,341,054 B1 | 1/2002 | Walder et al. ................ 361/66 |
| 6,347,027 B1 | 2/2002 | Nelson et al. |
| 6,351,823 B1 | 2/2002 | Mayer et al. |
| 6,356,422 B1 | 3/2002 | Bilac et al. |
| 6,356,849 B1 | 3/2002 | Jaffe |
| 6,369,996 B1 | 4/2002 | Bo |
| 6,377,051 B1 | 4/2002 | Tyner et al. |
| 6,377,874 B1 * | 4/2002 | Ykema ...................... 700/286 |
| 6,385,022 B1 | 5/2002 | Kulidjian et al. |
| 6,396,279 B1 | 5/2002 | Gruenert |
| 6,397,155 B1 | 5/2002 | Przydatek et al. |
| 6,405,104 B1 | 6/2002 | Dougherty |
| 6,406,328 B1 | 6/2002 | Attarian et al. |
| 6,411,865 B1 | 6/2002 | Qin et al. |
| 6,441,931 B1 | 8/2002 | Moskovich et al. |
| 6,459,997 B1 | 10/2002 | Andersen |
| 6,496,342 B1 | 12/2002 | Horvath et al. |
| 6,535,797 B1 | 3/2003 | Bowles et al. |
| 6,549,880 B1 | 4/2003 | Willoughby et al. |
| 6,553,418 B1 | 4/2003 | Collins et al. |
| 2001/0010032 A1 | 7/2001 | Ehlers et al. |
| 2001/0032025 A1 | 10/2001 | Lenz et al. |
| 2001/0044588 A1 | 11/2001 | Mault |
| 2001/0048354 A1 | 12/2001 | Douville et al. |
| 2001/0055965 A1 | 12/2001 | Delp et al. |
| 2002/0010518 A1 | 1/2002 | Reid et al. |
| 2002/0032535 A1 | 3/2002 | Alexander et al. |
| 2002/0034086 A1 | 3/2002 | Scoggins et al. |
| 2002/0045992 A1 | 4/2002 | Shincovich et al. |
| 2002/0059401 A1 | 5/2002 | Austin |
| 2002/0063635 A1 | 5/2002 | Shincovich |
| 2002/0064010 A1 | 5/2002 | Nelson et al. |
| 2002/0091949 A1 | 7/2002 | Ykema |
| 2002/0094799 A1 | 7/2002 | Elliott et al. |
| 2002/0107615 A1 | 8/2002 | Bjorklund |
| 2002/0108065 A1 | 8/2002 | Mares |
| 2002/0109722 A1 | 8/2002 | Rogers et al. |
| 2002/0111980 A1 | 8/2002 | Miller et al. |
| 2002/0116092 A1 | 8/2002 | Hamamatsu et al. |
| 2002/0124011 A1 | 9/2002 | Baxter et al. |
| 2002/0146076 A1 | 10/2002 | Lee |
| 2002/0146083 A1 | 10/2002 | Lee et al. |
| 2002/0147503 A1 | 10/2002 | Osburn, III |
| 2002/0159402 A1 | 10/2002 | Binder |
| 2002/0162014 A1 | 10/2002 | Przydatek et al. |
| 2002/0163918 A1 | 11/2002 | Cline |
| 2002/0165677 A1 | 11/2002 | Lightbody et al. |
| 2002/0181174 A1 | 12/2002 | Bilac et al. |
| 2002/0193888 A1 | 12/2002 | Wewalaarachchi et al. |
| 2003/0043785 A1 | 3/2003 | Liu et al. |

* cited by examiner

METHOD FOR POWER DISTRIBUTION SYSTEM COMPONENTS IDENTIFICATION, CHARACTERIZATION AND RATING

CROSS REFERENCE TO RELATED APPLICATIONS

This application is related to U.S. patent application Ser. No. 60/359,544 filed on Feb. 25, 2002 for "Integrated Protection, Monitoring, and Control" the content of which is incorporated in its entirety herein by reference. This application is also related to U.S. patent application Ser. No. 60/438,159 filed on Jan. 6, 2003 for "Single Processor Concept for Protection and Control of Circuit Breakers in Low-Voltage Switchgear" the content of which is incorporated in its entirety herein by reference.

BACKGROUND OF THE INVENTION

This invention relates generally to electrical switchgear and more particularly, to a method for facilitating identification, characterization and rating of power distribution system components.

In an industrial power distribution system, power generated by a power generation company may be supplied to an industrial or commercial facility wherein the power may be distributed throughout the industrial or commercial facility to various equipment such as, for example, motors, welding machinery, computers, heaters, lighting, and other electrical equipment. At least some known power distribution systems include switchgear which facilitates dividing the power into branch circuits which supply power to various portions of the industrial facility. Circuit breakers are provided in each branch circuit to facilitate protecting equipment within the branch circuit. Additionally, circuit breakers in each branch circuit can facilitate minimizing equipment failures since specific loads may be energized or de-energized without affecting other loads, thus creating increased efficiencies, and reduced operating and manufacturing costs. Similar switchgear may also be used within an electric utility transmission system and a plurality of distribution substations, although the switching operations used may be more complex.

Switchgear typically include multiple devices, other than the power distribution system components, to facilitate providing protection, monitoring, and control of the power distribution system components. For example, at least some known breakers include a plurality of shunt trip circuits, under-voltage relays, trip units, and a plurality of auxiliary switches that close the breaker in the event of an undesired interruption or fluctuation in the power supplied to the power distribution components. Additionally, at least one known power distribution system also includes a monitor device that monitors a performance of the power distribution system, a control device that controls an operation of the power distribution system, and a protection device that initiates a protective response when the protection device is activated.

In at least some other known power distribution systems, a monitor and control system operates independently of the protective system. For example, a protective device may de-energize a portion of the power distribution system based on its own predetermined operating limits, without the monitoring devices recording the event. The failure of the monitoring system to record the system shutdown may mislead an operator to believe that an over-current condition has not occurred within the power distribution system, and as such, a proper corrective action may not be initiated by the operator. Additionally, a protective device, i.e. a circuit breaker, may open because of an over-current condition in the power distribution system, but the control system may interpret the over-current condition as a loss of power from the power source, rather than a fault condition. As such, the control logic may undesirably attempt to connect the faulted circuit to an alternate source, thereby restoring the over-current condition. In addition to the potential increase in operational defects which may occur using such devices, the use of multiple devices and interconnecting wiring associated with the devices may cause an increase in equipment size, an increase in the complexity of wiring the devices, and/or an increase in a quantity of devices installed.

BRIEF DESCRIPTION OF THE INVENTION

In one aspect, a method for operating a power distribution system is provided. The power distribution system includes a plurality of components, and at least one node electronics unit coupled to at least one control processing unit. The method includes associating a unique identifier with at least one component class of the power distribution system, identifying each component based on the identifier, determining a specification associated with each identifier, and operating at least one of the node electronics unit and the control processing unit based on the determined specification.

DETAILED DESCRIPTION OF THE INVENTION

Figure 1:
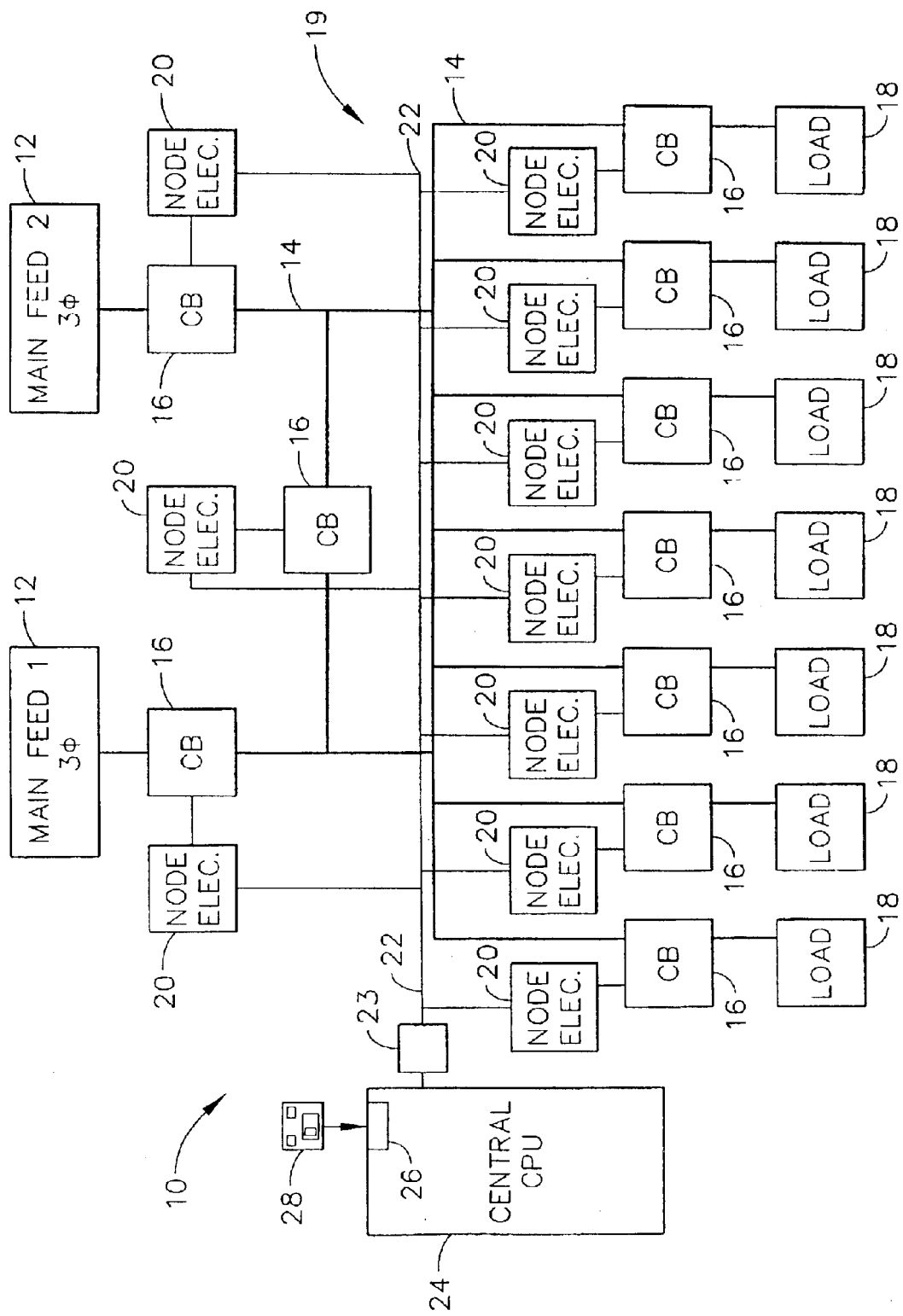
FIG. 1 is an exemplary schematic illustration of a power distribution system.

FIG. 1 illustrates an exemplary schematic illustration of a power distribution system 10, used by an industrial facility for example. In an exemplary embodiment, system 10 includes at least one main feed system 12, a power distribution bus 14, a plurality of power circuit switches or interrupters, also referred to herein as a circuit breakers (CB) 16, and at least one load 18, such as, but not limited to, motors, welding machinery, computers, heaters, lighting, and/or other electrical equipment.

In use, power is supplied to a main feed system 12, i.e. a switchboard for example, from a source (not shown) such as, but not limited to, a steam turbine, powered from, for example, a nuclear reactor or a coal fired boiler, a gas turbine generator, and a diesel generator. Power supplied to main feed system 12 is divided into a plurality of branch circuits using circuit breakers 16 which supply power to various loads 18 in the industrial facility. In addition, circuit breakers 16 are provided in each branch circuit to facilitate protecting equipment, i.e. loads 18, connected within the respective branch circuit. Additionally, circuit breakers 16 facilitate minimizing equipment failures since specific loads 18 may be energized or de-energized without affecting other loads 18, thus creating increased efficiencies, and reduced operating and manufacturing costs.

Power distribution system 10 includes a circuit breaker control protection system 19 that includes a plurality of node electronics units 20 that are each electrically coupled to a digital network 22. Circuit breaker control protection system 19 also includes at least one central control processing unit (CCPU) 24 that is electrically coupled to digital network 22 via a switch 23 such as, but not limited to, an Ethernet switch 23. In use, each respective node electronics unit 20 is electrically coupled to a respective circuit breaker 16, such that CCPU 24 is electrically coupled to each circuit breaker 16 through digital network 22 and through an associated node electronics unit 20.

In the exemplary embodiment, digital network 22 is a Fast Ethernet protocol network. In another embodiment, digital network 22 includes, for example, at least one of a local area network (LAN) or a wide area network (WAN), dial-in-connections, cable modems, and special high-speed ISDN lines. Digital network 22 also includes any device capable of interconnecting to the Internet including a web-based phone, personal digital assistant (PDA), or other web-based connectable equipment. It should be appreciated that the digital network 22 network is upgradeable based on future revisions to IEEE 802.3(u) and its successors. It should further be appreciated that the digital network 22 is configurable, for example, in a star topology.

In one embodiment, CCPU 24 is a computer and includes a device 26, for example, a floppy disk drive or CD-ROM drive, to facilitate reading instructions and/or data from a computer-readable medium 28, such as a floppy disk or CD-ROM. In another embodiment, CCPU 24 executes instructions stored in firmware (not shown). CCPU 24 is programmed to perform functions described herein, but other programmable circuits can likewise be programmed. Accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Additionally, although described in a power distribution setting, it is contemplated that the benefits of the invention accrue to all electrical distribution systems including industrial systems such as, for example, but not limited to, an electrical distribution system installed in an office building.

Figure 2:
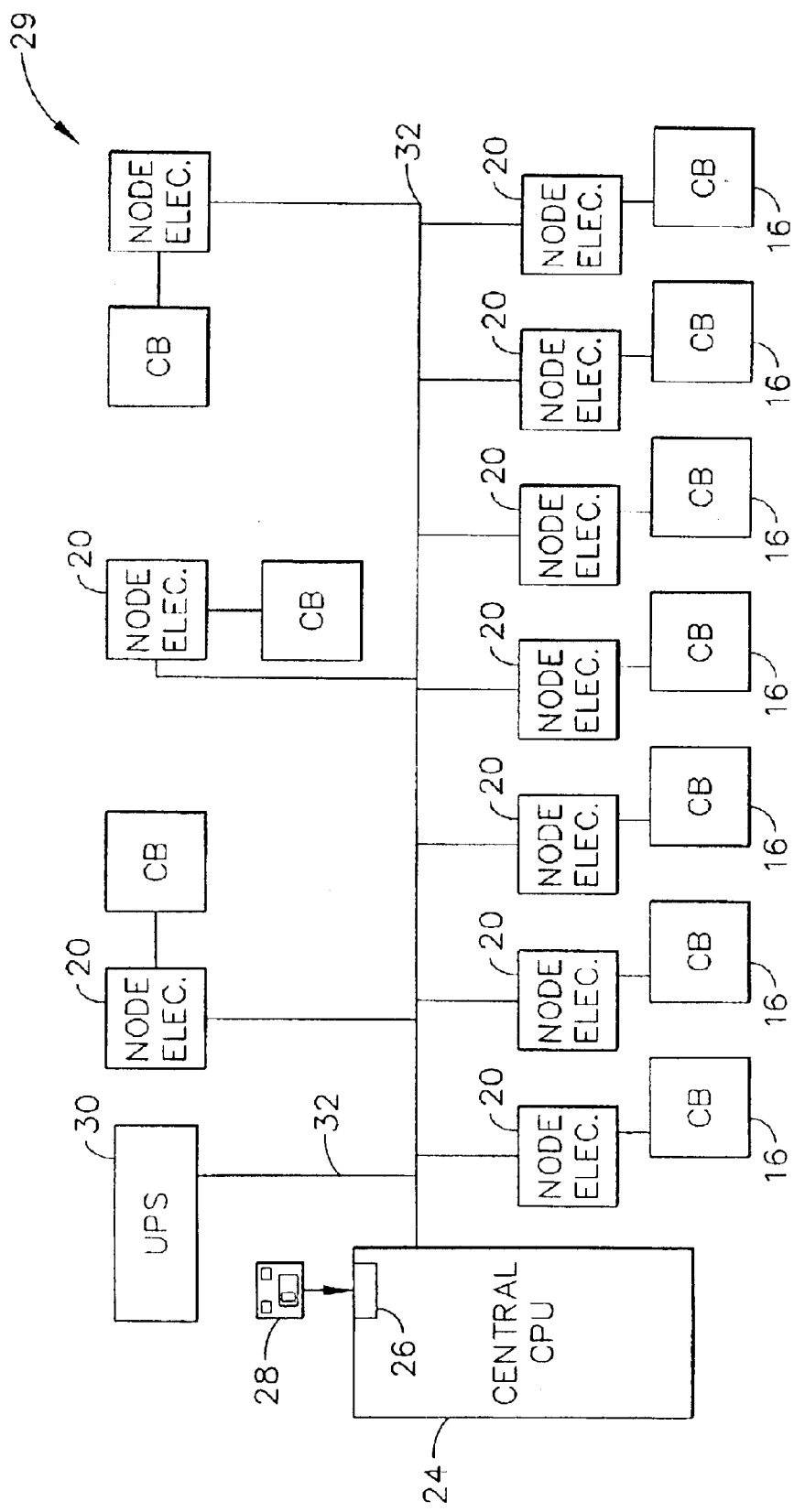
FIG. 2 is an exemplary schematic illustration of a node power system.

FIG. 2 is an exemplary schematic illustration of a node power distribution system 29 that can be used with power distribution system 10 (shown in FIG. 1) and more specifically, with circuit breaker control protection system 19 (shown in FIG. 1). Node power distribution system 29 includes a power source 30 that is electrically coupled to node electronics units 20 through a node power distribution bus 32. In an exemplary embodiment, power source 30 is an uninterruptible power supply (UPS). In one embodiment, power source 30 receives power from power distribution system 10 and then distributes this power to node electronics units 20 through node power distribution bus 32. In an alternative embodiment, power is not supplied to power source 30, but rather, power source 30 supplies power to node electronics units 20 using an internal power supply, such as, but not limited to, a plurality of batteries (not shown). In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32.

Figure 3:
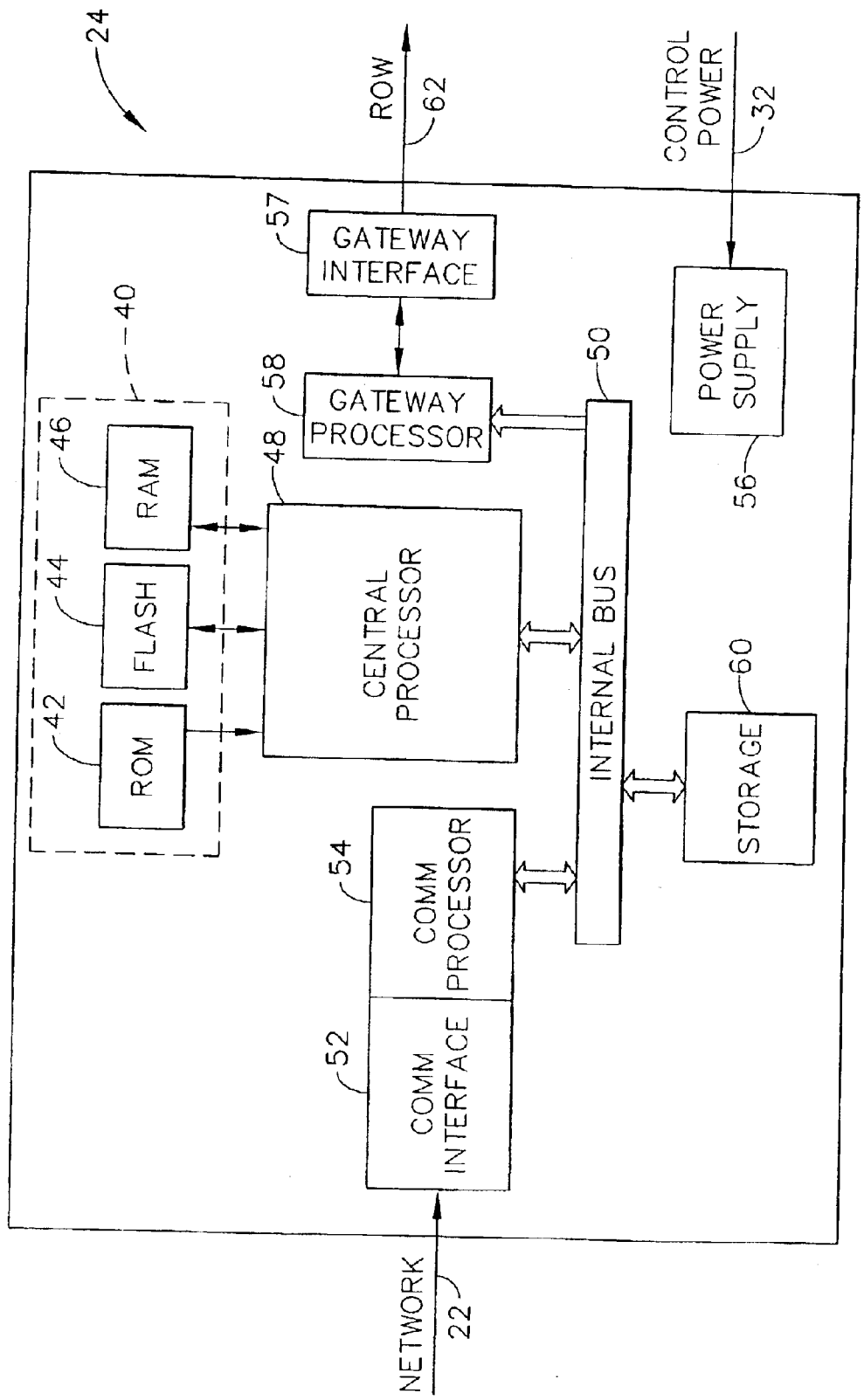
FIG. 3 is an exemplary schematic illustration of a central control processing unit that may used with the power distribution system shown in FIG. 1.

FIG. 3 is an exemplary schematic illustration of CCPU 24. CCPU 24 includes at least one memory device 40, such as, but not limited to, a read only memory (ROM) 42, a flash memory 44, and/or a random access memory (RAM) 46. CCPU 24 also includes a central processor unit (CPU) 48 that is electrically coupled to at least one memory device 40, as well as an internal bus 50, a communications interface 52, and a communications processor 54. In an exemplary embodiment, CCPU 24 is a printed circuit board and includes a power supply 56 to supply power to a plurality of devices on the printed circuit board.

Additionally, in an exemplary embodiment, internal bus 50 includes an address bus, a data bus, and a control bus. In use, the address bus is configured to enable CPU 48 to address a plurality of internal memory locations or an input/output port, such as, but not limited to communications interface 52 through communications processor 54, and a gateway interface 58, through a gateway processor 56. The data bus is configured to transmit instructions and/or data between CPU 48 and at least one input/output, and the control bus is configured to transmit signals between the plurality of devices to facilitate ensuring that the devices are operating in synchronization. In the exemplary embodiment, internal bus 50 is a bi-directional bus such that signals can be transmitted in either direction on internal bus 50. CCPU 24 also includes at least one storage device 60 configured to store a plurality of information transmitted via internal bus 50.

In use, gateway interface 58 communicates to a remote workstation (not shown) via an Internet link 62 or an Intranet 62. In the exemplary embodiment, the remote workstation is a personal computer including a web browser. Although a single workstation is described, such functions as described herein can be performed at one of many personal computers coupled to gateway interface 58. For example, gateway interface 58 may be communicatively coupled to various individuals, including local operators and to third parties, e.g., remote system operators via an ISP Internet connection. The communication in the example embodiment is illustrated as being performed via the Internet, however, any other wide area network (WAN) type communication can be utilized in other embodiments, i.e., the systems and processes are not limited to being practiced via the Internet. In one embodiment, information is received at gateway interface 58 and transmitted to node electronics unit 20 via CCPU 24 and digital network 22. In another embodiment, information sent from node electronics unit 20 is received at communication interface 52 and transmitted to Internet 62 via gateway interface 58.

Figure 4:
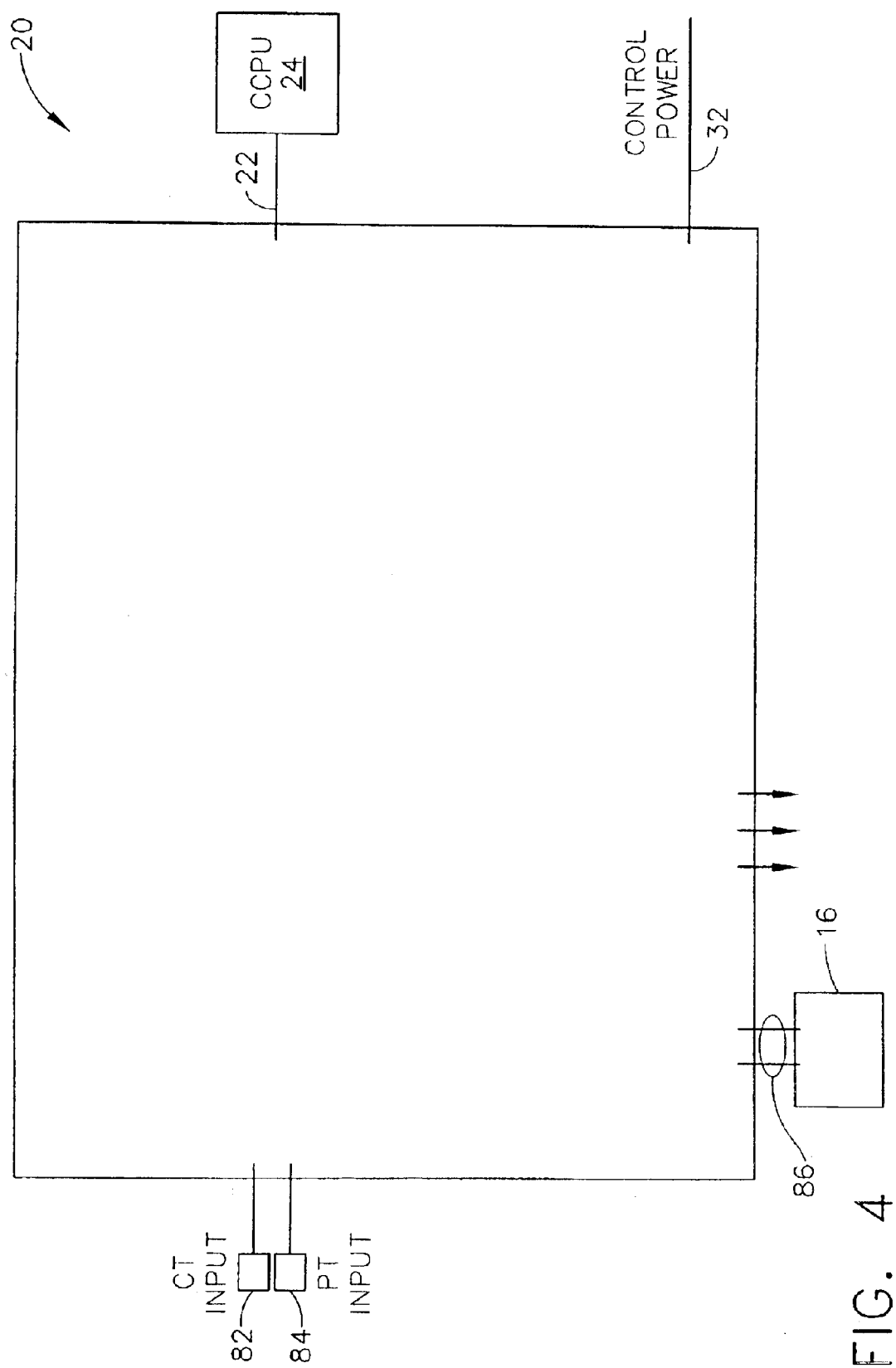
FIG. 4 is an exemplary schematic illustration of a node electronic unit that may used with the power distribution system shown in FIG. 1.

FIG. 4 is an exemplary schematic illustration of single node electronic unit 20. In the exemplary embodiment, node electronic unit 20 is a unitary device mounted remotely from CCPU 24 and circuit breaker 16. In an exemplary embodiment, node electronic unit 20 is separate from, but proximate to circuit breaker 16. In an exemplary embodiment, node electronic unit 20 is a printed circuit board.

In one embodiment, node electronics unit 20 receives signals input from a plurality of devices, such as, but not limited to, a current sensor 82, a voltage sensor 84, and/or circuit breaker 16. Status signals from circuit breaker 16 can include signals related to one or more conditions of the breaker, such as, but not limited to, an auxiliary switch status, and a spring charge switch status. Additionally, node electronics unit 20 sends signals to at least circuit breaker 16 in order to control one or more states of the breaker.

In use, signals are transmitted to CCPU 24 via node electronics unit 20, and digital network 22. Node electronics unit 20 receives the signals and packages a digital message that includes the signals and additional data relating to a health and status of node electronics unit 20. The health and status data may include information based on problems found by internal diagnostic routines and a status of self checking routines that run locally in node electronics unit 20. CCPU 24 processes digital message using one or more protection algorithms, monitoring algorithms, and any combination thereof. In response to the processing of digital message, CCPU 24 sends digital message back to node electronics unit 20 via digital network 22. In the exemplary embodiment, node electronics unit 20 actuates circuit breaker 16 via signal in response to digital message received from CCPU 24. In one embodiment, circuit breaker 16 is actuated in response to commands sent only by CCPU 24, i.e., circuit breaker 16 is not controlled locally by node electronics unit 20, but rather is operated remotely from CCPU 24 based on digital message received from node electronics unit 20 over network 22.

Figure 5:
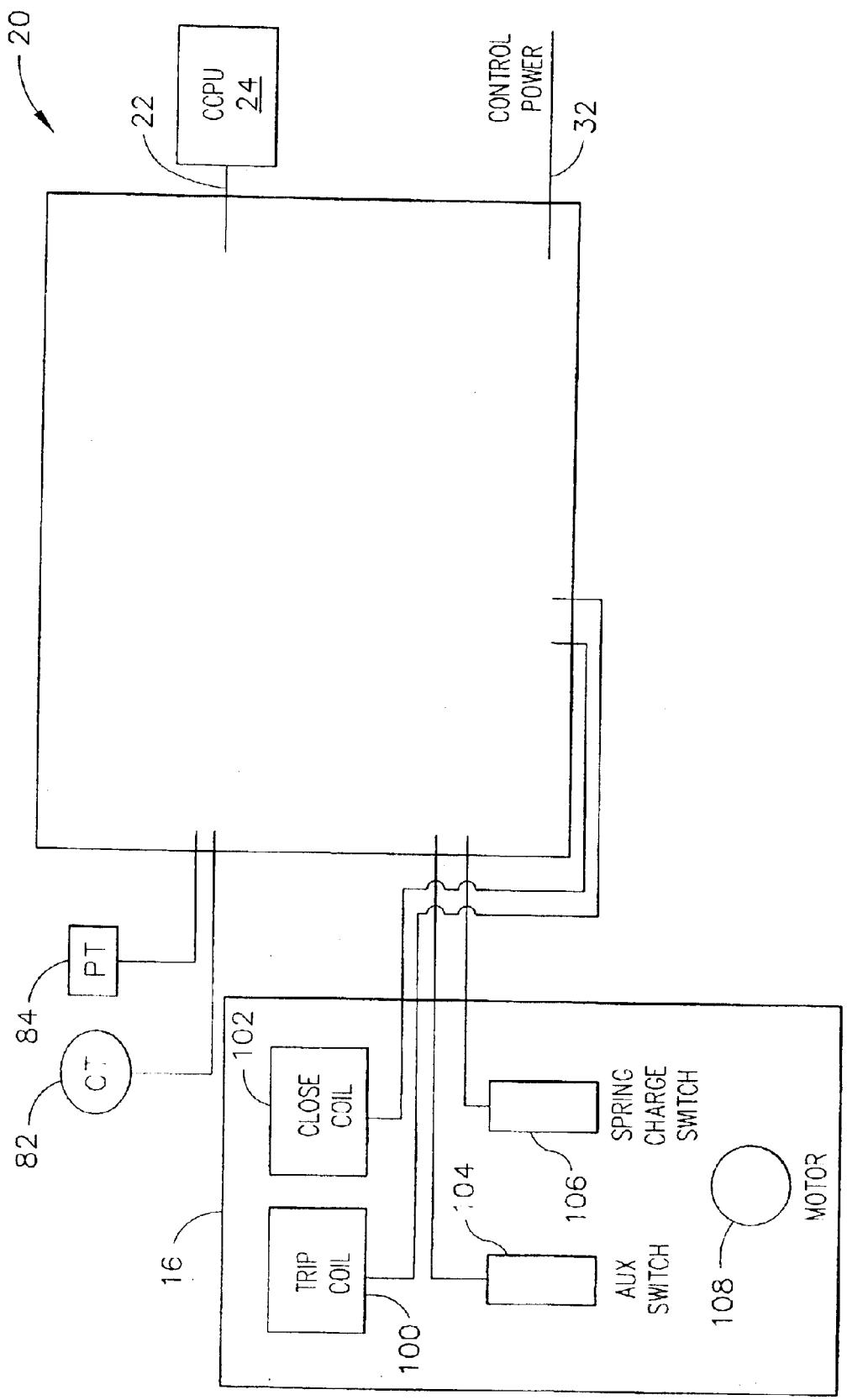
FIG. 5 is an exemplary schematic illustration of a circuit breaker that may used with the power distribution system shown in FIG. 1.

FIG. 5 is an exemplary schematic illustration of circuit breaker 16 that is electrically coupled to node electronics unit 20. In the exemplary embodiment, circuit breaker 16 includes a switch assembly that includes movable and/or stationary contacts, an arc suppression means, and a tripping and operating mechanism. Circuit breaker 16 includes only a trip coil 100, a close coil 102, an auxiliary switch 104, a spring charge switch 106, and a motor 108. Circuit breaker 16 does not include a trip unit. The various components of breaker 16 (e.g., trip coil 100, close coil 102, auxiliary switch 104, spring charge switch 106, motor 108) can be powered by node electronics unit 20. Alternately, breaker 16 can be powered by secondary current available from current sensor 82 and/or voltage sensor 84.

Circuit breaker 16 is in electrical communication with node electronics unit 20 through a wiring harness 110 (not shown in FIG. 5), which may include copper wiring, communications conduits, and any combination thereof. Current sensor 82, and voltage sensor 84 are in electrical communication with node electronics unit 20 through a cable 112 (not shown in FIG. 5) that may include copper wiring, communications conduits, and any combination thereof. In an exemplary embodiment, circuit breaker 16 is a unitary device mounted proximate to node electronics unit 20, current sensor 82, and voltage sensor 84.

In use, actuation signals from node electronics unit 20 are transmitted to circuit breaker 16 to actuate a plurality of functions in circuit breaker 16, such as, but not limited to, operating a trip coil 100, operating a close coil 102, and affecting a circuit breaker lockout feature. An auxiliary switch 104 and operating spring charge switch 106 provide a status indication of circuit breaker parameters to node electronics unit 20. Motor 108 is configured to recharge an operating spring, configured as a close spring (not shown) after circuit breaker 16 closes. It should be appreciated that the motor 108 can include, for example, a spring charge switch, a solenoid or any other electromechanical device capable of recharging a trip spring. To close circuit breaker 16, a close coil 102 is energized by a close signal from actuation power module 90. Close coil 102 actuates a closing mechanism (not shown) that couples at least one movable electrical contact (not shown) to a corresponding fixed electrical contact (not shown). The closing mechanism of circuit breaker 16 latches in a closed position such that when close coil 102 is de-energized, circuit breaker 16 remains closed. When breaker 16 closes, an "a" contact of auxiliary switch 104 also closes and a "b" contact of auxiliary switch 104 opens. The position of the "a" and "b" contacts is sensed by node electronics unit 20. To open circuit breaker 16, node electronics unit 20 energizes trip coil (TC) 100. TC 100 acts directly on circuit breaker 16 to release the latching mechanism that holds circuit breaker 16 closed. When the latching mechanism is released, circuit breaker 16 will open, opening the "a" contact and closing the "b" contact of auxiliary switch 104. Trip coil 100 is then de-energized by node electronics unit 20. After breaker 16 opens, with the close spring recharged by motor 108, circuit breaker 16 is prepared for a next operating cycle. In the exemplary embodiment, each node electronics unit 20 is coupled to circuit breaker 16 in a one-to-one correspondence. For example, each node electronics unit 20 communicates directly with only one circuit breaker 16. In an alternative embodiment, node electronics unit 20 may communicate with a plurality of circuit breakers 16.

Figure 6:
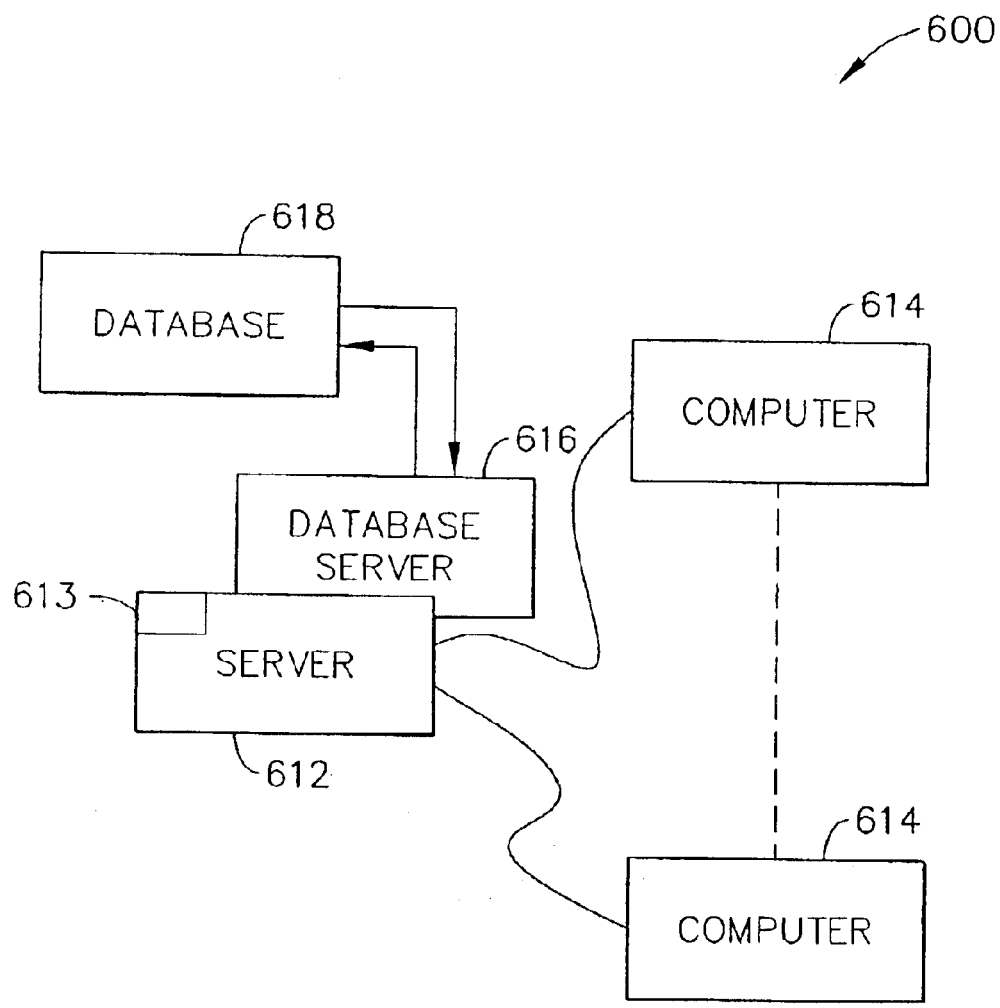
FIG. 6 is a simplified block diagram of a power distribution system design computer system.

FIG. 6 is a simplified block diagram of a power distribution system design computer system 600 including a server system 612 including a disk storage unit 613 for data storage, and a plurality of client sub-systems, also referred to as client systems 614, connected to server system 612. In one embodiment, client systems 614 are computers including a web browser, such that server system 612 is accessible to client systems 614 via the Internet. Client systems 614 are interconnected to the Internet through many interfaces including a network, such as a local area network (LAN) or a wide area network (WAN), dial-in-connections, cable modems and special high-speed ISDN lines. Client systems 614 could be any device capable of interconnecting to the Internet including a web-based phone, personal digital assistant (PDA), or other web-based connectable equipment. A database server 616 is connected to a database 618 containing information on a variety of matters, as described below in greater detail. In one embodiment, centralized database 618 is stored on server system 612 and can be accessed by potential users at one of client systems 614 by logging onto server system 612 through one of client systems 614. In an alternative embodiment database 618 is stored remotely from server system 612 and may be non-centralized.

Figure 7:
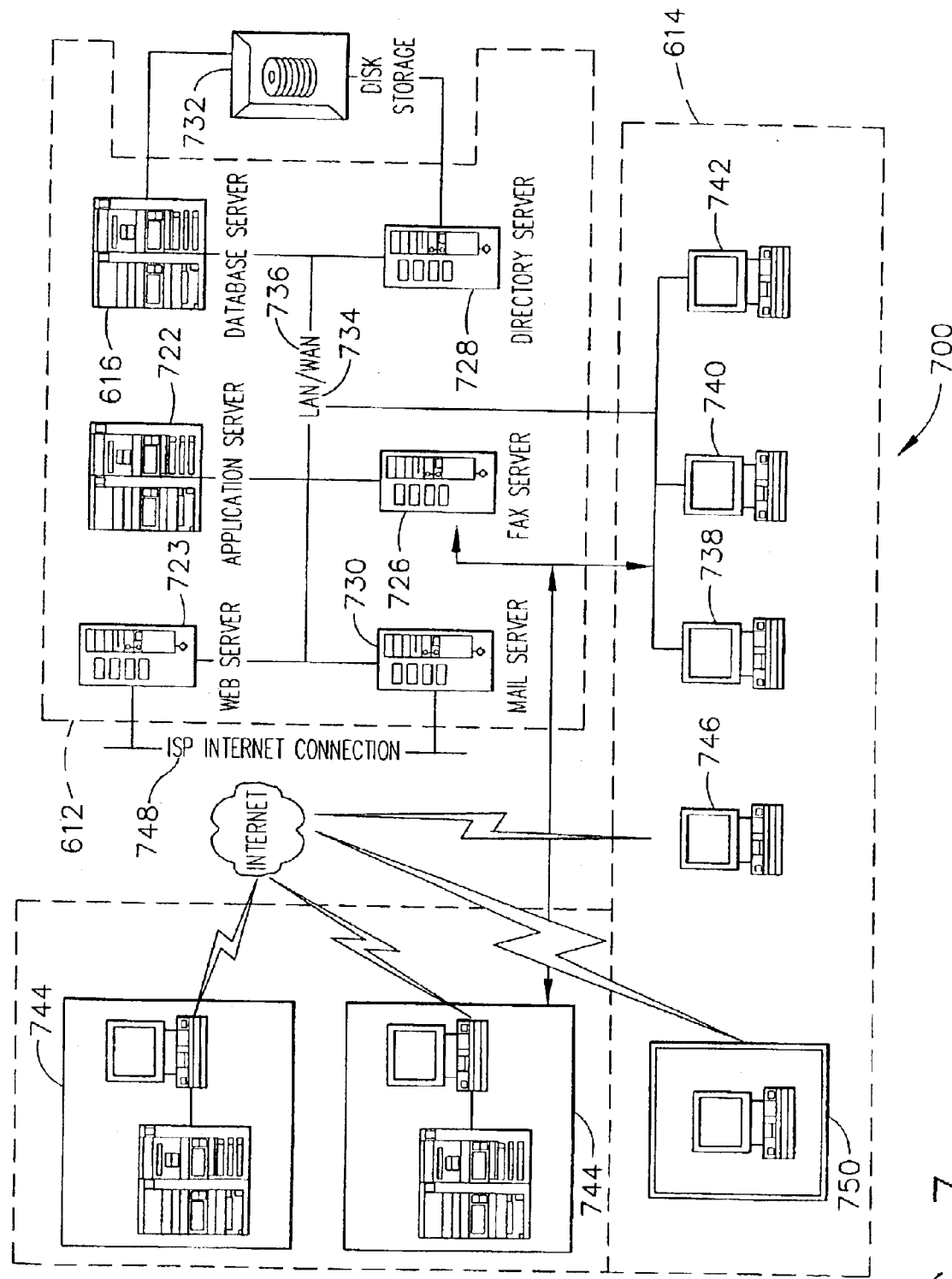
FIG. 7 is an expanded version block diagram of an example embodiment of a server architecture of power distribution system design computer system shown in FIG. 6.

FIG. 7 is an expanded version block diagram 700 of an example embodiment of a server architecture of power distribution system design computer system 100 shown in FIG. 6. Components in diagram 700, identical to components of system 600 (shown in FIG. 6), are identified in FIG. 7 using the same reference numerals as used in FIG. 6. System 700 includes server system 612 and client systems 614. Server system 612 further includes database server 616, an application server 722, a web server 723, a fax server 726, a directory server 728, and a mail server 730. Disk storage unit 732 is coupled to database server 616 and directory server 728. Servers 616, 722, 723, 726, 728, and 730 are coupled in a local area network (LAN) 734. In addition, a system administrator's workstation 738, a user workstation 740, and a supervisor's workstation 742 are coupled to LAN 734. Alternatively, workstations 738, 740, and 742 are coupled to LAN 734 via an Internet link or are connected through an Intranet.

Each workstation, 738, 740, and 742 is a personal computer having a web browser. Although the functions performed at the workstations typically are illustrated as being performed at respective workstations 738, 740, and 742, such functions can be performed at one of many personal computers coupled to LAN 734. Workstations 738, 740, and 742 are illustrated as being associated with separate functions only to facilitate an understanding of the different types of functions that can be performed by individuals having access to LAN 734. In an example embodiment, client system 614 includes workstation 750 which can be used by an internal analyst or a designated outside field engineer to review power distribution system design information relating to a system.

Server system 612 is configured to be communicatively coupled to various individuals, including employee workstation 744 and to design engineer workstation 746 via an ISP Internet connection 748. The communication in the example embodiment is illustrated as being performed via the Internet, however, any other wide area network (WAN) type communication can be utilized in other embodiments, i.e., the systems and processes are not limited to being practiced via the Internet. In addition, and rather than WAN 736, local area network 734 could be used in place of WAN 736.

In the exemplary embodiment, any authorized individual having a workstation 744 can access power distribution system design computer system 600. At least one of the client systems includes a manager workstation 750 located at a remote location. Workstations 744 and 750 are personal computers having a web browser. Also, workstations 744 and 750 are configured to communicate with server system 612. Furthermore, fax server 726 communicates with remotely located client systems, including a client system 750 via a telephone link. Fax server 726 is configured to communicate with other client systems 738, 740, and 742 as well.

Figure 8:
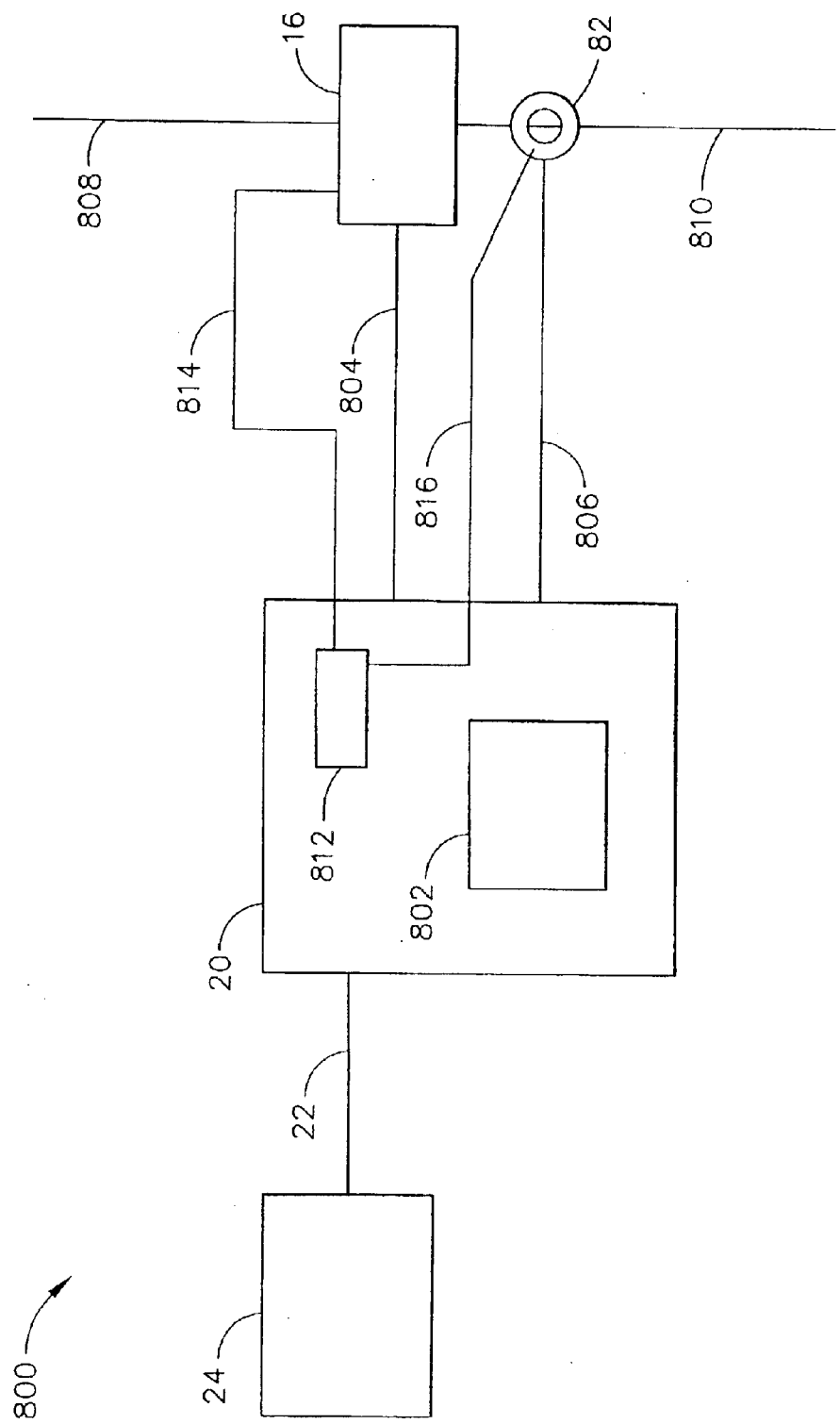
FIG. 8 is a block diagram of an exemplary embodiment of a power distribution system component identification system.

FIG. 8 is a block diagram of an exemplary embodiment of a power distribution system 10 component identification system 800. Components of power distribution system 10 in FIG. 8 that are identical to components shown in FIGS. 1–7 are numbered in FIG. 8 using the same reference numerals used in FIGS. 1–7. Accordingly, system 800 includes CCPU 24, network 22, node electronics unit 20 that includes a processor 802. Circuit breaker 16 is coupled to node electronics unit 20 through a standard wiring harness 804 and current transformer 82 is coupled through node electronics unit 20 through cable 806. Circuit breaker 16 includes multiple pairs of electrical contacts, each pair corresponding to a electrical phase of power distribution system 10. A first contact of each pair is coupled to a busbar line side 808, and a second contact in each pair is coupled to a busbar load side 810.

Node electronics unit 20 includes an identification interface circuit 812 that is communicatively coupled to circuit breaker 16 through cable 814 and to current transformer 82 through cable 816. Cable 814 and 816 transmit component property signals from circuit breaker 16 and current transformer 82 to identification interface circuit 812 in node electronics unit 20.

Identification interface circuit 812 is configured to sense parameters associated with each component class positioned in circuit breaker 16 and current transformer 82. A component class includes replacement components with similar features and ratings of the original component. Identification interface circuit 812 uses the sensed parameters to identify the component of interest. For example, identification interface circuit 812 may identify a current transformer by calculating its turns ratio from a sensed primary coil voltage when a voltage is applied to the secondary coil of the current transformer. Additionally, during normal operation identification interface circuit 812 may identify a current transformer by calculating its turns ratio from a ratio of a primary voltage and a secondary voltage of the current transformer during normal power distribution system operation. A circuit breaker may be identified by sensing a cross sectional area of a circuit breaker conductor, a circuit breaker conductor resistivity, and/or a circuit breaker contact voltage drop.

In use, node electronics unit 20 may sense that a component has been replaced, such as, by an internal monitoring program executing on processor 802. Node electronics unit 20 may also determine, on a periodic basis, to verify the identity of components coupled to it. Processor 802 sends a command to identification interface circuit 812 instructing identification interface circuit 812 to sample component properties. The sampled property signals are relayed to processor 802 wherein the identification of each component is determined. Processor 802 transmits the component identification to CCPU 24 for further error-checking, processing, historical archiving. If the determined properties of any component does not match the stored properties in node electronics unit 20, processor 802 flags the mismatch as an error.

Figure 9:
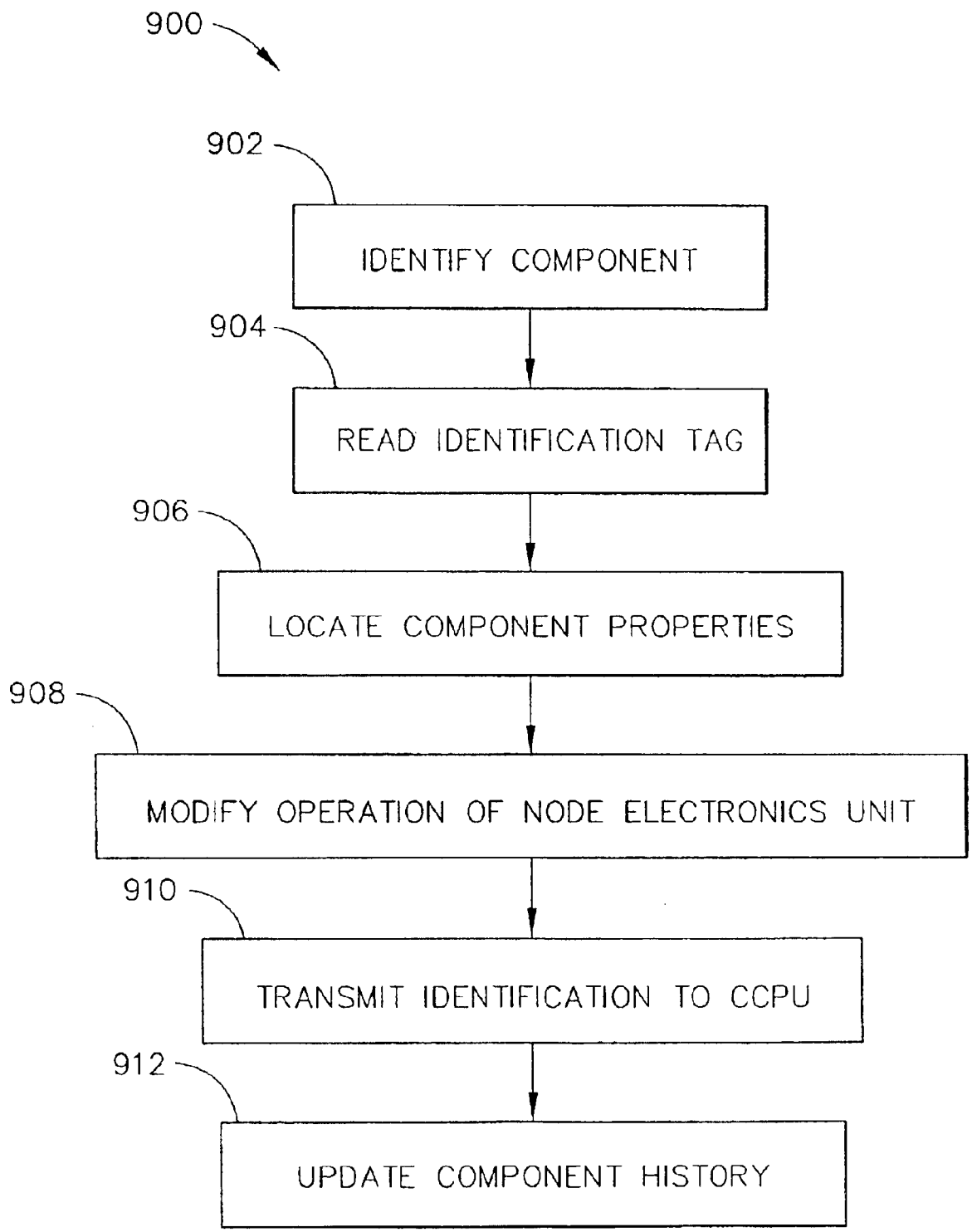
FIG. 9 is a flowchart of an exemplary process for identifying components in the power distribution system shown in FIG. 1.

FIG. 9 is a flowchart of an exemplary process 900 for identifying components in the power distribution system 10 shown in FIG. 1. Each component of power distribution system 10 may be labeled to facilitate identifying the component to node electronics unit 20. In one embodiment, the label may be a tag that is optically scanned on a periodic basis to read an identifying marking on the tag. In another embodiment, the label may be a chip coupled to the component that may be interrogated, electrically, magnetically, and/or electro-magnetically wherein the chip may respond to the interrogation with an identifying readable sequence. Each component may be associated with a unique identifier with at least one component class of the power distribution system. Node electronics unit 20 initiates process 900 to identify 902 components coupled to it through identification interface circuit 812 based on the identifier or associates 902 a unique identifier with at least one component class of the power distribution system.

Identification interface circuit 812 identifies 902 each component by reading 904 a label or by determining an electrical parameter associated with each component and matching the determined parameter to a corresponding parameter in node electronics unit 20 that uniquely identifies the component. When the component identification is determined, electrical and operational properties may be located in a database accessible to node electronics unit 20. The electrical and operational properties are used to verify or modify 908 the operation of node electronics unit 20, such as, by adjusting calibration constants, local protection trip setpoints, or other node electronics unit 20 operational settings. Node electronics unit 20 transmits 910 the determined identity of each component to CCPU 24 over network 22. CCPU 24 performs additional error checking and updates 912 the component identification to a historical record database accessible to CCPU 24. Power distribution system 10 operates node electronics units 20 and CCPU 24 based on the determined specification.

The component class may include a circuit breaker 16, a current transformer 82, a voltage sensor 84, a busbar, and a protective relay and each component may be communicatively coupled to a respective node electronics unit 20 and node electronics unit 20 may determine a specification associated with each identifier and report a representation of each respective component specifications to other node electronics unit, and the CCPUs. Power distribution system 10 operates based on the reported specifications. In the exemplary embodiment, an identified component operating history is located in a computer database and may be retrieve for further processing by node electronics unit 20 and/or CCPU 24.

A unique identifier that is associated with each component may include labeling that, for example, may include an optically readable identifier, an electronically readable identifier, a magnetically readable identifier, an electro-magnetically readable identifier, and an acoustically readable identifier. The identifier used in each particular case is related to environmental conditions and manufacturing ease. In the exemplary embodiment, the identifier is readable and writable, such as a microchip that is interrogatable and modifiable. The identifier includes a component history, a present component health, a predicted component health, a calibration parameter, a component characterization, a component rating, an information translation instruction, a component setup instruction, a component operation instruction, and a component location. In an alternative embodiment, the identifier is a similar to a serial number in that the identifier is used locate component information from a database accessible to node electronics unit 20 and/or CCPU 24.

A component health identifier may include electrical stresses, mechanical stresses, thermal stresses, environmental stresses, operational quality metrics that are collected by node electronics unit 20 and/or CCPU 24 and periodically updated. Additionally, the identifier is used to derate components to operate at a reduced component rating based on the identifier when it is determined that the component has been exposed to conditions that may adversely affect its rating. In the case wherein a component is derated, further modification of the component identifier without an authorized intervention may be disabled to ensure the component is not operated outside the derate bounds unless authorized by a controlling authority. Derating may be accomplished by modifying a component parameter through a service interface communicatively coupled to a node electronics unit 20. Authenticating modifications may be made through, for example, an electronic authentication, a mechanical authentication, a electromechanical authentication, an optical authentication, a biological authentication, and a chemical authentication. Derating a component rating may also be based on a parameter of a component external to the power distribution system, for example, a power distribution system component may be derated based on a component wire size, a component power consumption, a component heat generation capability, and a component current rating.

A physical and/or electrical topology of power distribution system 10 may be deduced or inferred from component identifiers and component location when a representation of each respective component specifications is transmitted to CCPU 24 though network 22.

A component may also be identified and located by determining a characteristic of the component, retrieving a component characteristic from a computer database, and matching the determined characteristic to the retrieved characteristic. A characteristic may be determined during operation by measuring component behavior during operation of power distribution system 10. In the exemplary embodiment, a component characteristic may include at least one of a physical characteristic, a chemical characteristic, an electrical characteristic, and a thermal characteristic. An electrical characteristic may be at least one of a primary coil voltage of a current transformer with a voltage applied to the secondary coil of the current transformer, a ratio of a primary voltage and a secondary voltage of a current transformer during normal power distribution system operation, a cross sectional area of a circuit breaker conductor, a circuit breaker conductor resistivity, a circuit breaker contact voltage drop, a busbar temperature, and an ejected particle characteristic. A component characteristic may also be determined by exciting a component receiving excitation responses from the excited component, receiving observations from the excited components, and determining a component characteristic based on the excitation responses and the observations. A component may be excited from a component external to the power distribution system, for example, a remote control system, or a maintenance data collection system. The component may be excited electrically, magnetically, acoustically, optically, and/or electro-magnetically. Exciting the component electro-magnetically may include excitation by a signal carried along the power line to the component or may be by a wireless transmission. Observations of the component excitation response may be accomplished by interfacing with a local database, interfacing with a remote database, a manual visual inspection, and/or an automated visual inspection.

Based on stored component specification and a component response to an excitation, calibration constants in node electronics unit 20 may be modified.

A determined component specification may be compared to a valid specification retrieved from a database based on the component location, and a action response may be generated if a component specification is not valid for the component location. An action response may include of logging an invalid specification, reporting an invalid specification, correcting a component specification, replacing a component specification fail-safe values, operating power distribution system 10 in a modified mode, and suspending power distribution system operation.

The above-described power distribution system identification systems are cost-effective and highly reliable. Each system includes a plurality components associated with an identifier or an interrogatable device coupled to it, and a node electronics unit for controlling the identification process. Node electronics unit identifies each component and looks up the component properties in a database accessible to the node electronics unit. The node electronics unit then uses the looked-up properties to modify the operation of the node electronics unit, if necessary. This method offers performance advantages over existing methods of ensuring proper components are coupled to the power distribution system. Proper component installation may occur on an ongoing basis and upon startup of the system. Accordingly, the power distribution system facilitates protection and optimization of power system operation in a cost-effective and reliable manner.

Exemplary embodiments of power distribution system components are described above in detail. The components are not limited to the specific embodiments described herein, but rather, components of each system may be utilized independently and separately from other components described herein. Each power distribution system component can also be used in combination with other power distribution system components.

While the invention has been described in terms of various specific embodiments, those skilled in the art will recognize that the invention can be practiced with modification within the spirit and scope of the claims.

What is claimed is:

1. A method for operating a power distribution system wherein the power distribution system includes a plurality of components, and at least one node electronics unit coupled to at least one control processing unit, said method comprising:

associating a unique identifier with at least one component class of the power distribution system;

identifying each component based on the identifier;

determining a specification associated with each identifier;

reporting by said node electronics unit, a representation of each respective component specifications to at least one other node electronics unit, and the control processing unit; and causing the power distribution system to operate at least one of the node electronics unit and the control processing unit based on the determined specification.

2. A method in accordance with claim 1 further comprising operating a centrally controlled power distribution system wherein the at least one control processing unit is a central control processing unit.

3. A method in accordance with claim 2 further comprising operating the centrally controlled power distribution system wherein the component class includes at least one of a circuit breaker, a current transformer, a potential transformer, a busbar, and a protective relay, and wherein each component is communicatively coupled to a respective node electronics unit.

4. A method in accordance with claim 1 wherein determining a specification associated with each identifier comprises determining a specification associated with each identifier by the associated node electronics unit, the method further comprising:

operating the power distribution system based on the reported specifications.

5. A method in accordance with claim 4 further comprising locating an identified component operating history in a computer database.

6. A method in accordance with claim 4 further comprising processing power distribution system control functions with the node electronics unit.

7. A method in accordance with claim 4 wherein associating a unique identifier comprises labeling at least one of the components with an identifier wherein the identifier includes at least one of an optically readable identifier, an electronically readable identifier, a magnetically readable identifier, an electro-magnetically readable identifier, and an acoustically readable identifier.

8. A method in accordance with claim 7 further comprises labeling at least one of the components with an identifier that is readable and writable, and wherein the identifier includes at least one of a component history, a present component health, a predicted component health, a calibration parameter, a component characterization, a component rating, an information translation instruction, a component setup instruction, a component operation instruction, and a component location.

9. A method in accordance with claim 8 wherein labeling at least one of the components with an identifier that includes a present component health comprises labeling at least one of the components with a health identifier that includes at least one of electrical stresses, mechanical stresses, thermal stresses, environmental stresses, operational quality metrics.

10. A method in accordance with claim 8 further comprising derating components to operate at a reduced component rating based on the identifier.

11. A method in accordance with claim 10 further comprising:

modifying a component parameter; and writing the modification to the identifier.

12. A method in accordance with claim 11 further comprising disabling further modification of the component identifier without an authorized intervention.

13. A method in accordance with claim 10 wherein derating comprises modifying a component parameter through a service interface communicatively coupled to at least one of the node electronics units.

14. A method in accordance with claim 13 further comprises authenticating modifications through at least one of an electronic authentication, a mechanical authentication, a electromechanical authentication, an optical authentication, a biological authentication, and a chemical authentication.

15. A method in accordance with claim 10 wherein derating comprises derating a component rating based on a parameter of a component external to the power distribution system.

16. A method in accordance with claim 15 further comprising derating a component based on at least one of a power distribution system component wire size, a power distribution system component power consumption, a power distribution system component heat generation capability, and a power distribution system component current rating.

17. A method in accordance with claim 7 further comprising deducing a physical topology and an electrical topology of the power distribution system based component identifiers and component location.

18. A method in accordance with claim 1 wherein reporting a representation of each respective component specifications comprises transmitting a representation of each respective component specifications to the CCPU though the network.

19. A method in accordance with claim 1 further comprising:

determining a characteristic of at least one of the plurality of components;

retrieving a plurality of component characteristics from a computer database; and matching the determined characteristic to the retrieved characteristic.

20. A method in accordance with claim 19 further comprising measuring component behavior during operation of the power distribution system.

21. A method in accordance with claim 19 wherein determining a characteristic comprises determining at least one of a physical characteristic a chemical characteristic, an electrical characteristic, and a thermal characteristic.

22. A method in accordance with claim 21 wherein determining an electrical characteristic comprises determining at least one of a primary coil voltage of a current transformer with a voltage applied to the secondary coil of the current transformer, a ratio of a primary voltage and a secondary voltage of a current transformer during normal power distribution system operation, a cross sectional area of a circuit breaker conductor, a circuit breaker conductor resistivity, a circuit breaker contact voltage drop, a busbar temperature, and an ejected particle characteristic.

23. A method in accordance with claim 4 further comprising:
exciting a component to facilitate identifying the component;
receiving excitation responses from excited components;
receiving observations from the excited components; and
determining at least one of a physical and electrical topology of the power distribution system based on at least one of the excitation responses and the observations.

24. A method in accordance with claim 23 wherein exciting a component comprises exciting the component from a component external to the power distribution system.

25. A method in accordance with claim 23 wherein exciting a component comprises exciting the component at least one of electrically, magnetically, acoustically, optically, and electro-magnetically.

26. A method in accordance with claim 25 wherein exciting the component electro-magnetically comprises exciting the component using at least one of a power line carrier and a wireless transmission.

27. A method in accordance with claim 23 wherein receiving observations comprises at least one of interfacing with a local database, interfacing with a remote database, a manual visual inspection, and an automated visual inspection.

28. A method in accordance with claim 4 wherein operating at least one of the node electronics units further comprises modifying calibration constants in the node electronics unit based on at least one of a stored component specification and a component response to an excitation.

29. A method in accordance with claim 28 wherein modifying calibration constants in the node electronics unit based on a component response to an excitation comprises modifying calibration constants in the node electronics unit based on a component response to a plurality of excitations.

30. A method in accordance with claim 28 wherein modifying calibration constants in the node electronics unit based on a component response to an excitation comprises modifying calibration constants in the node electronics unit based on a component response to an excitation from a component external to the power distribution system.

31. A method in accordance with claim 4 further comprising:
comparing each component specification to a valid specification based on the component location; and
generating an action response if a component specification is not valid for the component location.

32. A method in accordance with claim 31 wherein generating an action response comprises at least one of logging an invalid specification, reporting an invalid specification, correcting a component specification, replacing a component specification failsafe values, operating the power distribution system in a modified mode, and suspending power distribution system operation.

33. A method for operating a centrally-controlled power distribution system wherein the power distribution system includes a plurality of components communicatively coupled to a respective node electronics unit, and at least one node electronics unit coupled to at least one central control processing unit, said method comprising:
associating a unique identifier with at least one component class of the power distribution system wherein the identifier includes at least one of an optically readable identifier, an electronically readable identifier, a magnetically readable identifier, an electro-magnetically readable identifier, and an acoustically readable identifier;
identifying each component based on the identifier;
determining a specification associated with each identifier;
reporting, by the associated node electronics unit, a representation of each respective component specifications to at least one other node electronics unit, and the at least one central control processing unit;
causing the power distribution system to operate based on the reported specifications; and
causing the cower distribution system to operate at least one of the node electronics unit and the control processing unit based on the determined specification.

* * * * *